United States Patent
Lundsgaard et al.

(10) Patent No.: US 6,916,572 B2
(45) Date of Patent: Jul. 12, 2005

(54) INTERLOCKING ISOLATOR FOR FUEL CELLS

(75) Inventors: Jorgen Schjerning Lundsgaard, Svendborg (DK); Henning Frederiksen, Svendborg (DK)

(73) Assignee: IRD Fuel Cells A/S, Svendborg (DK)

( * ) Notice: Subject to any disclaimer, the term of this patent is extended or adjusted under 35 U.S.C. 154(b) by 0 days.

(21) Appl. No.: 10/802,155

(22) Filed: Mar. 17, 2004

(65) Prior Publication Data
US 2004/0219416 A1 Nov. 4, 2004

Related U.S. Application Data

(60) Provisional application No. 60/456,075, filed on Mar. 19, 2003.

(51) Int. Cl.[7] ................................................. H01M 8/10
(52) U.S. Cl. ............................. 429/34; 429/37; 429/39
(58) Field of Search ............................. 429/34, 35, 36, 429/37, 38, 39

(56) References Cited

U.S. PATENT DOCUMENTS

| | | |
|---|---|---|
| 4,469,579 A | 9/1984 | Covitch et al. ............. 204/283 |
| 4,826,554 A | 5/1989 | McIntyre et al. ............ 156/280 |
| 5,211,984 A | 5/1993 | Wilson ........................ 427/115 |
| 5,272,017 A | 12/1993 | Swathirajan et al. .......... 429/33 |
| 5,316,871 A | 5/1994 | Swathirajan et al. .......... 429/33 |
| 5,399,184 A | 3/1995 | Harada ...................... 29/623.4 |
| 5,472,799 A | 12/1995 | Watanabe .................... 429/30 |
| 5,474,857 A | 12/1995 | Uchida et al. ................ 429/33 |
| 5,702,755 A | 12/1997 | Mussell ..................... 427/115 |

FOREIGN PATENT DOCUMENTS

| WO | WO 02/039533 A3 | 5/2002 | |
| WO | WO 02/039533 | * 5/2002 | ............ H01M/8/10 |

* cited by examiner

*Primary Examiner*—Michael Barr
*Assistant Examiner*—Monique Wills
(74) *Attorney, Agent, or Firm*—Licata & Tyrrell P.C.

(57) ABSTRACT

An interlocking isolator for a proton exchange membrane fuel cell is provided which protects a fuel cell positioned in the interlocking isolator from electricity and heat. The interlocking isolator also permits multiple fuel cells positioned with the isolators to be stacked adjacently, thereby forming fuel cell stacks.

2 Claims, 2 Drawing Sheets

INTERLOCKING ISOLATOR FOR FUEL CELLS

This application claims the benefit of priority from U.S. Provisional Application Ser. No. 60/456,075 filed Mar. 19, 2003, which is herein incorporated by reference in its entirety.

FIELD OF THE INVENTION

An interlocking isolator for proton exchange membrane fuel cells is provided. The isolator provides a polymer frame surrounding the flow plates and membrane electrode assembly and diffusion layer of the fuel cell. This polymer frame isolates the fuel cell from heat and electricity. The frame further contains a means for slidably interlocking an adjacent frame thereto. Accordingly, these interlocking isolators are useful in creating fuel cell stacks.

BACKGROUND OF THE INVENTION

Fuel cells are energy conversion devices being considered as a possible alternative to internal combustion engines. One type of fuel cell comprises a solid polymer electrolyte (SPE) membrane, such as a sulfonated fluorinated polymer membrane material like NAFION, which provides ion exchange between the cathode and anode electrodes. Various configurations of SPE fuel cells as well as methods for their preparation have been described. See e.g. U.S. Pat. No. 4,469,579; U.S. Pat. No. 4,826,554; U.S. Pat. No. 5,211,984; U.S. Pat. No. 5,272,017; U.S. Pat. No. 5,316,871; U.S. Pat. No. 5,399,184; U.S. Pat. No. 5,472,799; U.S. Pat. No. 5,474,857; and U.S. Pat. No. 5,702,755.

SPE fuel cells offer several advantages over liquid electrolyte fuel cells. These include greater power densities, lower operating temperatures, and longer operating lifetimes. In addition, SPE materials are generally resistant to corrosion and easy to incorporate into fuel cell structures. Accordingly, attempts have been made to utilize these various solid polymer electrolyte (SPE) fuel cells as an electronic power source for electric automobiles and space crafts.

However, the need for a catalyst such as platinum in the SPE fuel cells has made these cells more expensive than alternative energy sources.

WO 02/39533 discloses membrane electrode assemblies for use in direct methanol fuel cells comprising a polymer electrolyte membrane with cathode and anode layers having a low content of catalysts with cathode and anode layers on either side of the membrane. In these assemblies, the membrane electrode assemblies are serigraphically printed on an electron conducting substrate such as graphite or carbon paper with an ink comprising catalyst loaded carbon and water dispersed polymer electrolyte membrane material dispersed in a mixture of water, propanol and methanol. Following printing, the anode and cathode layers are boiled in deionized water to remove impurities. The anode and cathode layers and the polymer electrolyte membrane are then placed in a constraint and axially or semi-isostatically compressed, preferably via heat, to form the membrane electrode assemblies.

The present invention provides an interlocking isolator for proton exchange membrane fuel cells such as described above. The interlocking isolator isolates the fuel cell positioned therein from electricity and heat. Further, the interlocking isolator provide a means by which fuel cells can be positioned adjacently to form a fuel cell stack providing higher desired voltages.

SUMMARY OF THE INVENTION

An aspect of the present invention relates to an interlocking isolator for a proton exchange membrane fuel cell. The interlocking isolator comprises a continuous polymer frame rectangular shape and having a top and bottom, four corners and an inner and outer edge. The frame has a lock at its inner edge for positioning of flow plates with a membrane electrode assembly and a diffusion layer of a fuel cell within the frame. The frame also has a means for slidably interlocking an adjacent frame thereto to create a fuel cell stack.

DETAILED DESCRIPTION OF THE INVENTION

The present invention provides an interlocking isolator for a proton exchange membrane fuel cell useful in creating stack of interlocking fuel cells.

Figure 1:
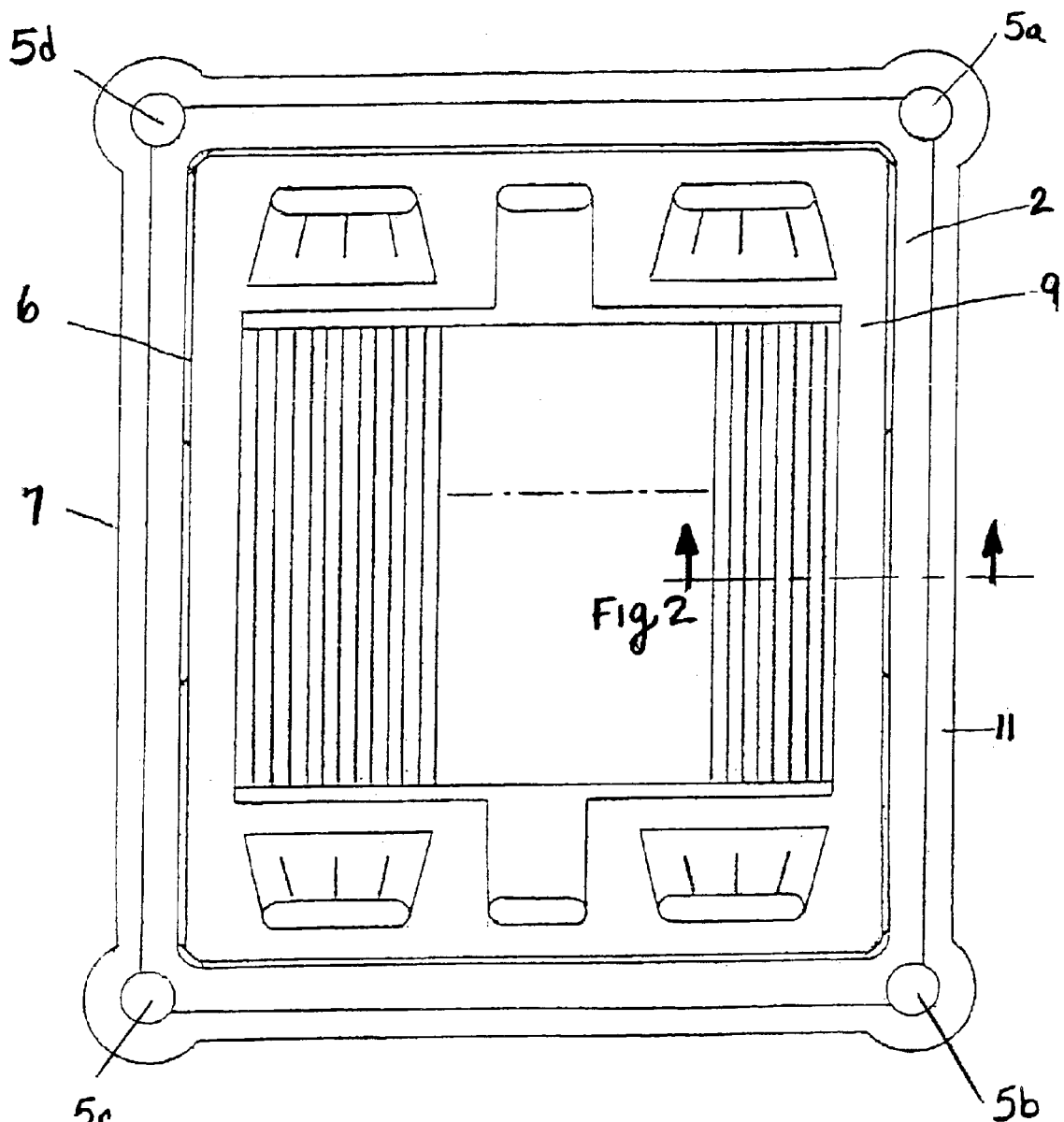
FIG. 1 provides a diagram of an interlocking isolator of the present invention with a fuel cell positions within the frame of the interlocking isolator.
Figure 2:
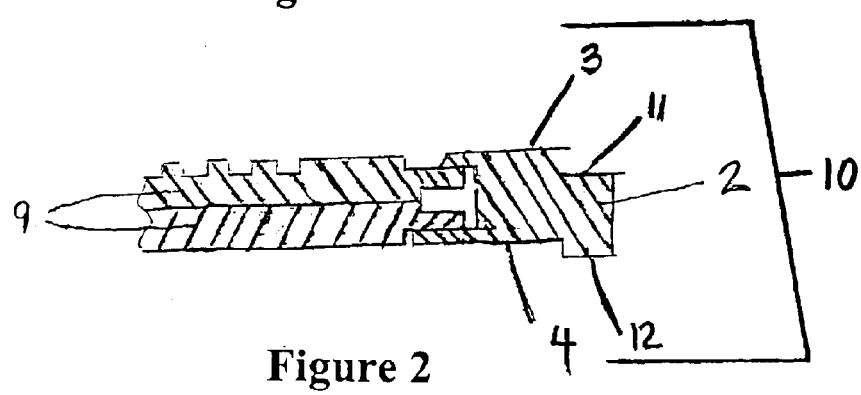
FIG. 2 provides a cross-sectional view of the frame and fuels cell positions within the frame of the interlocking isolator depicted in FIG. 1.
Figure 3:
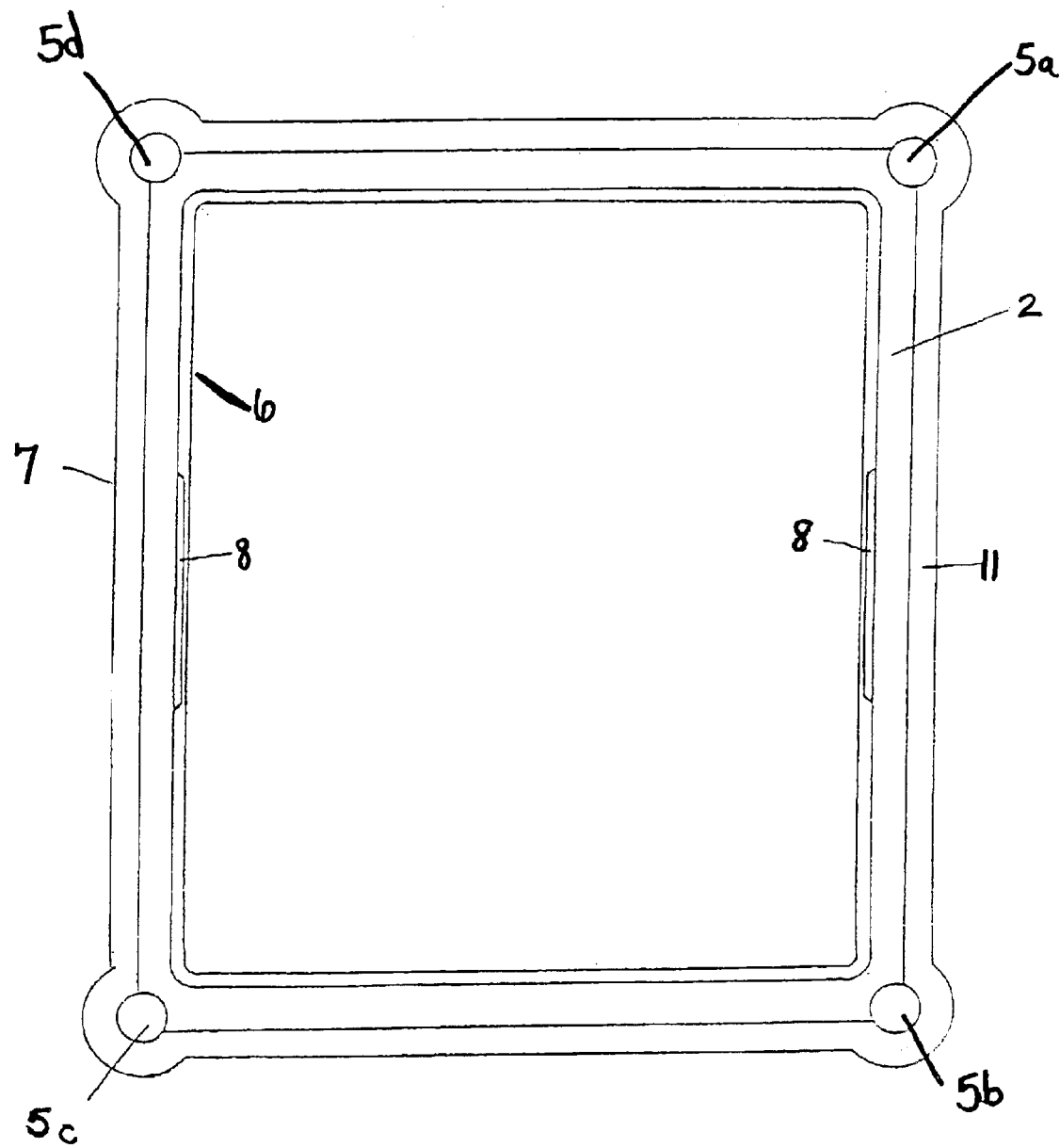
FIG. 3 provides a diagram of the interlocking isolator of the present invention without a fuel cell positioned within the frame.

As shown in FIGS. 1–3, the interlocking isolator of the present invention comprises a continuous polymer frame 2. The frame 2 is preferably rectangular shape for positioning of a proton exchange membrane fuel cell within the frame. As shown in FIG. 2, the frame has a top 3 and bottom 4. As shown in FIGS. 1 and 3, the frame also has four corners, 5a–d, and an inner edge 6 and an outer edge 7.

As shown in FIG. 3, one or more locks 8 are located at the inner edge 6 of the frame 2. As shown in FIG. 1, the lock or locks 8 are used for fixing or positioning two flow plates with a membrane electrode assembly and a diffusion layer of a fuel cell 9 within the frame 1.

The interlocking isolator of the present invention also comprises a means 10 within the frame 2 for slidably interlocking a second frame located adjacent thereto to the first frame 2. Further, this means allows for slidably interlocking multiple frames with fuel cells so that a fuel cell stack can be created. In a preferred embodiment, as depicted in FIG. 2, this means 10 for slidably interlocking the frame 2 to an adjacent frame to create a fuel cell stack comprises a groove 11 on the top 3 of the outer edge 7 and extending around the rectangular frame 2 and a tongue or tab 12 on the bottom 4 of the outer edge 7 of each corner 5a–d of the frame 2 sized to slide into the groove 11.

Thus, the interlocking isolator of the present invention protects the fuel cell from heat and electricity.

The interlocking isolator of the present invention also provides a means for creating stacks of fuel cells wherein a single fuel cell of the stack can be removed simply by sliding the frame in which the fuel cell is positioned from the stack. This fuel cell can then be repaired and reinserted into the stack. Alternatively, the fuel cell can be replaced with a new fuel cell positioned in an interlocking isolator of the present invention.

Fuel cell stacks produced using these interlocking isolators are useful in coupling the voltage of a series of single fuel cells to obtain a higher total desired voltage level and electromotive force.

What is claimed is:

1. An interlocking isolator for a proton exchange membrane fuel cell comprising:
   (a) a continuous polymer frame rectangular shape, said frame having a top and bottom, four corners and an inner and outer edge;
   (b) a lock at the inner edge of said frame for positioning of two flow plates with a membrane electrode assembly and a diffusion layer of a fuel cell with the frame; and
   (c) a means in the frame for slidably interlocking an adjacent frame thereto to create a fuel cell stack.

2. The interlocking isolator of claim 1 wherein said means for slidably interlocking the frame to an adjacent frame to create the fuel cell stack comprises a groove on the top of the outer edge and extending around the rectangular frame and a tongue or tab on the bottom outer edge of each corner of the frame sized to slide into the groove.

* * * * *